J. N. WINN.
Car-Coupling.
No. 225,675. Patented Mar. 16, 1880.
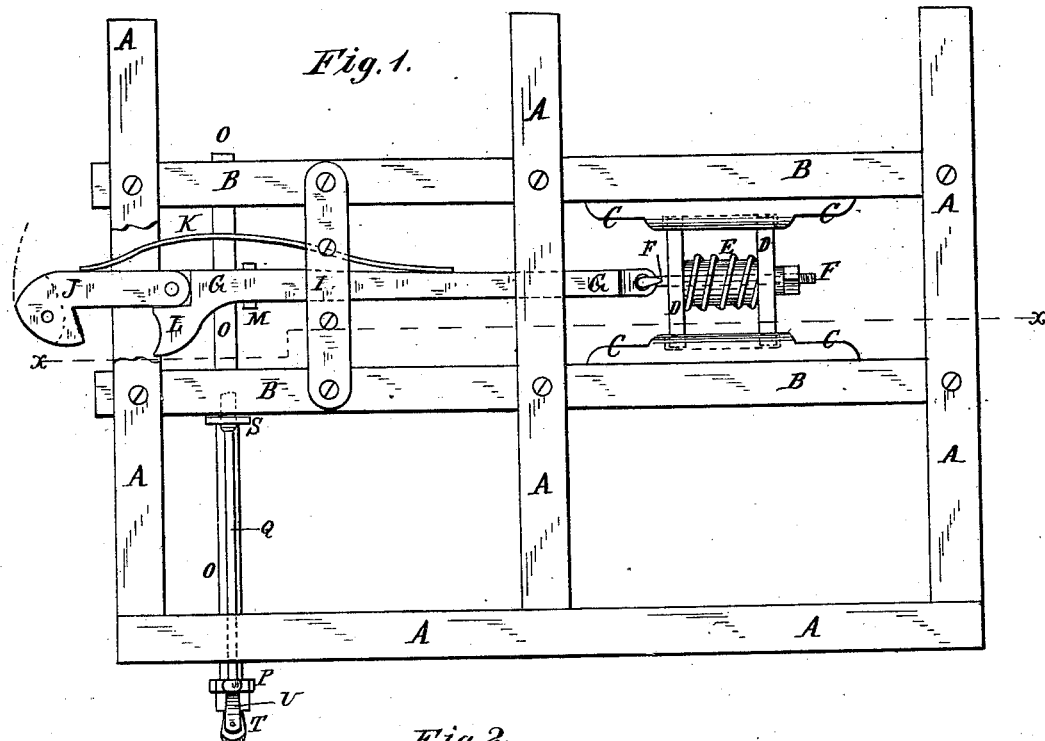
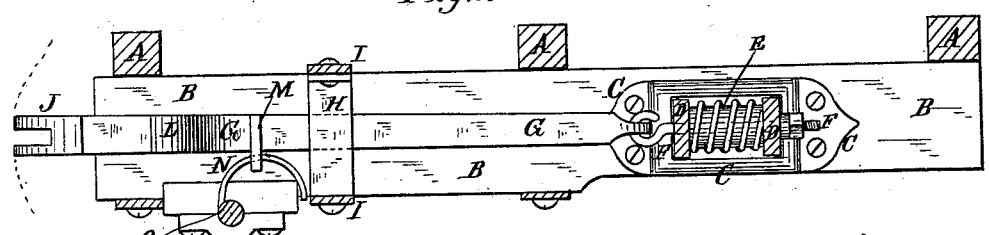
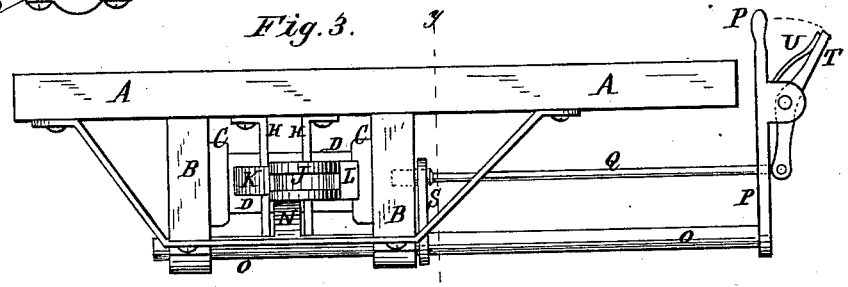
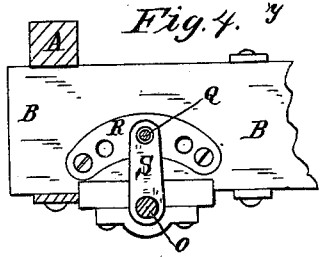
WITNESSES:
Henry N. Miller
C. Sedgwick
INVENTOR:
J. N. Winn
BY Munn & Co
ATTORNEYS.

UNITED STATES PATENT OFFICE.

JAMES N. WINN, OF DARIEN, GEORGIA.

CAR-COUPLING.

SPECIFICATION forming part of Letters Patent No. 225,675, dated March 16, 1880.

Application filed December 26, 1879.

*To all whom it may concern:*

Be it known that I, JAMES N. WINN, of Darien, in the county of McIntosh and State of Georgia, have invented a new and useful Improvement in Car-Couplings, of which the following is a specification.

Figure 1 is a plan view of the improvement. Fig. 2 is a sectional side elevation taken through the line $x\ x$, Fig. 1. Fig. 3 is a front elevation. Fig. 4 is a sectional side elevation taken through the line $y\ y$, Fig. 3.

Similar letters of reference indicate corresponding parts.

The object of this invention is to furnish car-couplings so constructed that they may be readily adjusted to couple cars of different heights, that they will couple the cars automatically as they are run together, and will be readily uncoupled.

A represents the frame of the car, to which are attached two parallel longitudinal bars, B, to receive the draft-strain. To the inner sides of the bars B are attached two plates, C, in the inner sides of which are formed longitudinal grooves, made with closed ends, to receive the ends of two cross-bars, D. Between the cross-bars D is placed the spring E, which may be made of rubber or of metal, or of rubber and metal, as may be desired.

F is a rod which passes through the cross-bars D and the spring E, and has a nut and washer upon its rear end. To the forward end of the rod F is hinged the rear end of the hook G, in such a way that the forward part of the said hook G may have a free vertical movement.

The hook G is held from lateral movement by two bars, H, placed upon the opposite sides of its middle part, and the ends of which are attached to two bars, I, secured at their ends to the upper and lower sides of the longitudinal bars B.

The forward end, J, of the hook G is hinged to the body of the said hook in such a way that it may be pushed back by the hook of an adjacent car when the cars are run together. The hook end J is held forward by a spring, K, attached to the body of the hook G, and which bears against the rear side of the hinged forward end, J, of the said hook. The hinged end J of the hook G, when pressed forward into line with the body of the hook G, rests against a shoulder, L, formed upon the forward end of the said body, as shown in Fig. 1.

The forward side of the shoulder L is concaved to receive the end of the hook of an adjacent car, when the cars are run together, and serve as a bumper for the cars.

Upon the lower side of the hook G J, a little in the rear of its joint, is formed, or to it is attached, a keeper, M, to receive a curved arm or cam, N, formed upon or rigidly attached to a rod or shaft, O, which works in bearings attached to the longitudinal bars B or other suitable supports. To the outer end of the shaft O is rigidly attached an arm, P, to serve as a lever for adjusting the hook G J.

The hook G J is held in any position into which it may be adjusted by the rod Q, the forward end of which enters one or another of the holes in the plate R, attached to the bar B.

The holes in the plate R are made in the arc of a circle, and the rod Q is kept in proper position to enter the said holes by passing through a guide-hole in the outer end of the arm S, rigidly attached to the shaft O at the side of the bar B, as shown in Figs. 3 and 4.

The outer part of the rod Q passes through a hole in the arm P, and its end is pivoted to the lower end of a lever, T, which is pivoted to the arm P.

The upper end of the lever T is held outward, holding the inner end of the rod Q forward to enter the holes of the plate R, by a spring, U, interposed between the ends of the lever T and arm P, as shown in Fig. 3.

With this construction the hook G J may be adjusted to couple cars of different heights with the same facility as if they were all of the same height. With this construction, also, the cars can be uncoupled by raising or lowering one of the hooks G J, by operating the lever P, so that the cars can be drawn apart.

Having thus described my invention, I claim as new and desire to secure by Letters Patent—

In a car-coupling, the hook G, having concave shoulder L, hinged to move vertically on a rod, F, between two side guides, H, and provided with a pivoted spring-held hook, J, as shown and described.

The above specification of my invention signed by me this 13th day of December, 1879.

JAMES N. WINN.

Witnesses:
 JAMES T. GRAHAM,
 C. SEDGWICK.